United States Patent [19]

Yamada

[11] Patent Number: 5,175,860
[45] Date of Patent: Dec. 29, 1992

[54] SYSTEM STRING SEARCH SYSTEM USING MATRIX MEMORY?COMPARATOR WITH COLUMNS SIMULTANEOUSLY COMPARING WITH SYMBOLS OF STRING SUPPLIED IN PARALLEL FROM A COLUMN OF INPUT SHIFT REGISTERS

[75] Inventor: Hachiro Yamada, Tokyo, Japan

[73] Assignee: NEC Corporation, Tokyo, Japan

[21] Appl. No.: 397,029

[22] Filed: Aug. 22, 1989

[30] Foreign Application Priority Data

Aug. 31, 1988 [JP] Japan ............... 63-217286

[51] Int. Cl.⁵ ............... G06F 7/20; G06F 7/02
[52] U.S. Cl. ............... 395/800; 364/244.2;
364/244.5; 364/245.1; 364/259.2; 364/929.1;
364/947.2; 364/948.3; 364/951.0; 364/961.1;
364/963.1; 364/965.2; 364/965.7; 364/DIG. 1;
340/146.2
[58] Field of Search ... 364/200 MS File, 900 MS File,
364/715.11; 340/146.2; 395/800

[56] References Cited
U.S. PATENT DOCUMENTS 4,550,436  10/1985  Freeman et al. ............... 382/34
4,896,133  1/1990   Methvin et al. ............... 340/146.2
4,907,194  3/1990   Yamada et al. ............... 365/49
4,959,811  9/1990   Szczepanek ............... 365/49
5,060,143  10/1991  Lee ............... 364/200
5,119,327  6/1992   Skinner ............... 395/800

Primary Examiner—Thomas C. Lee
Assistant Examiner—Ken S. Kim

[57] ABSTRACT

A symbol string collating apparatus includes a memory unit, a shift register, a collating unit, and an encoder. The memory unit includes memory circuits arranged in a matrix, stores a series of variable-length reference data with reference to a lower bit position of each column of the memory circuits, and stores specific data not including the reference data in a remaining portion. The shift register has the number of stages equal to the number of rows of the matrix and stores variable-length reference data to be collated which is externally input in series to the shift register in units of symbols. The collating unit collates the reference data stored in the shift register with the reference data stored in each column of the memory unit in units of bits. The encoder generates an output signal when at least a part of the reference data coincides with the reference data as a result of collating by the collating unit.

3 Claims, 5 Drawing Sheets

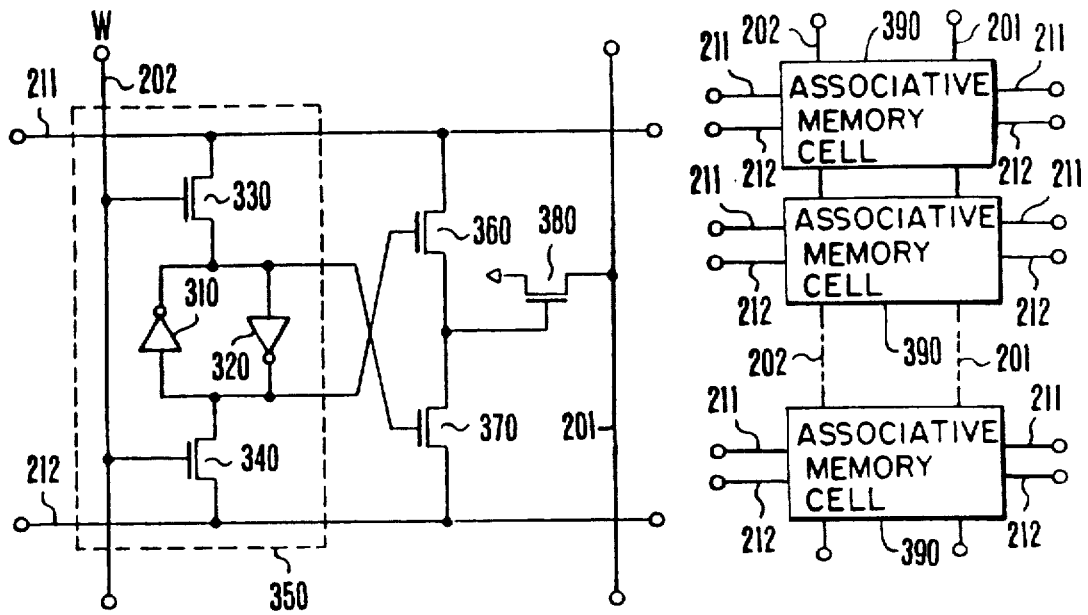
F I G. 4 (A)  F I G. 4 (B)
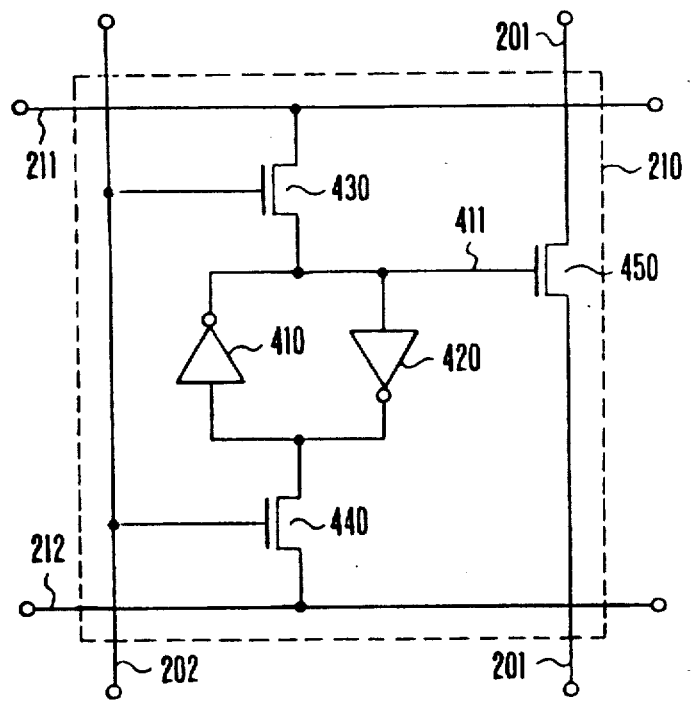
F I G. 5

SYSTEM STRING SEARCH SYSTEM USING MATRIX MEMORY?COMPARATOR WITH COLUMNS SIMULTANEOUSLY COMPARING WITH SYMBOLS OF STRING SUPPLIED IN PARALLEL FROM A COLUMN OF INPUT SHIFT REGISTERS

BACKGROUND OF THE INVENTION

The present invention relates to a symbol string collating apparatus and, more particularly, to a symbol string collating apparatus for finding a specific symbol string or data from a long symbol string or data in a text retrieval system or line control system for a communication line.

A symbol string collating apparatus is utilized to extract a feature series in a pattern recognition system, to extract a key word from a text file of a text input by using a wordprocessor or the like, to support language translation, to perform protocol control or data sorting control in a communication line, to create a non-structural data base using graphic patterns, images, texts, and the like. The symbol collating apparatus is essential in formation of such an information processing system or communication system to be intellectualized.

A conventional symbol collating apparatus is operated on the basis of software sequential processing of a versatile computer and therefore requires a long processing time. For this reason, a symbol string which can be collated is limited to a short symbol string or a structured symbol string which is delimited in units of words.

An operation of finding a location of a pattern including m symbol strings in a text including n symbol strings will be described below as an example.

In this case, collating of m symbol strings must be performed $(n - m + 1)$ times. For example, in order to find $m = 10^3$ character strings from a text including $n = 10^9$ character strings, symbol string collating processing must be performed about $10^{12}$ times. Therefore, since retrieval based on large-capacity source information of, e.g., texts, images, graphic patterns, or sounds is impractical, a key word is added to the source information beforehand to perform retrieval, or data structured into a table format is retrieved.

In order to solve the above problem, a method of directly collating a symbol string by using an associative memory (Japanese Patent Laid-Open Nos. 61-28132 and 61-28133) and a symbol string collating apparatus (Japanese Patent Laid-Open No. 61-95442) have been proposed.

A typical arrangement of these symbol string collating apparatuses will be described below.

These symbol string collating apparatuses store collating symbol strings in an associative memory and compare the collating symbol strings with externally, sequentially input symbol strings to be collated. If these symbol strings coincide with each other, a coincidence signal is output for each bit of the collating symbol string. A register array is constituted by registers each for storing a collated state of each bit. An input terminal of each collated state memory register of the register array is connected to each coincidence signal output terminal of the associative memory via a logical operator. Each collated state memory register corresponding to each bit stores "coincidence" only when an immediately preceding input symbol coincides with a symbol corresponding to an adjacent upper bit of the collating symbol string and a current input symbol coincides with a symbol corresponding to this adjacent upper bit of the collating symbol string. Therefore, when the input symbol string to be collated perfectly coincides with the collating symbol string, a collated state memory register corresponding to the last bit of the collating symbol string of the register array stores "coincidence".

In such a symbol string collating apparatus, collating processing can be performed by only sequentially supplying symbol strings to be collated to an address input of the associative memory. Therefore, high-speed symbol string collating processing can be realized. In addition, since a connection between the registers constituting the register array can be changed in accordance with the length and structure of the collating symbol string, collating can be flexibly performed for various symbol strings.

The above conventional symbol string collating apparatus requires registers for storing collated states of symbol strings, registers representing the lengths of the collating symbol strings, and a large number of logical gates for connecting the registers. These registers and the logical gates require an area 10 to 20 times larger than memory cells. That is, the conventional symbol string collating apparatus requires a number of large elements. Therefore, when the conventional apparatus is formed into an LSI arrangement, a chip size is increased, and cost is increased and reliability is degraded accordingly.

In addition, in the method of directly performing symbol string collating by using an associative memory, it is difficult to collate a variable-length symbol string.

SUMMARY OF THE INVENTION

It is, therefore, a principal object of the present invention to provide a symbol string collating apparatus capable of directly performing symbol string collating with a smaller number of elements than that of a conventional apparatus.

In order to achieve the above object of the present invention, there is provided a symbol string collating apparatus comprising a memory means, including memory circuits arranged in a matrix, for storing a series of variable-length reference data with reference to a lower bit position of each column of the memory circuits and storing specific data not including the reference data in a remaining portion, a shift register, having the number of stages equal to the number of rows of the matrix, for storing variable-length reference data to be collated which is externally input in series to the shift register in units of symbols, a collating means for collating the reference data stored in the shift register with the reference data stored in each column of the memory means in units of bits, and an encoder for generating an output signal when at least a part of the reference data coincides with the reference data as a result of collating by the collating means.

BRIEF DESCRIPTION OF THE DRAWINGS

FIG. 4A is a circuit diagram showing an associative memory cell in an associative memory circuit for use in the associative memory shown in FIG. 3;

FIG. 4B is a block diagram showing the associative memory circuit;

FIG. 5 is a circuit diagram showing a don't care memory cell for use in the associative memory shown in FIG. 3.

DETAILED DESCRIPTION OF THE PREFERRED EMBODIMENTS

Prior to a description of an embodiment of the present invention, the principle of the present invention will be briefly described below. A symbol string collating apparatus of the present invention stores a collating symbol string in each column of associative memory circuits arranged in a matrix manner in an associative memory. A symbol string to be collated is supplied from a shift register in parallel with the associative memory circuit columns and collated.

If an associative memory circuit which need not be collated is present, an opening/closing means called a don't care memory cell is operated by an externally input don't care signal, thereby opening a coincidence signal line of the associative memory circuit. Therefore, this associative memory circuit is not subjected to collating.

When a symbol of the symbol string to be collated supplied to each associative memory circuit column coincides with a collating symbol stored in each associative memory circuit of the column, a coincidence signal is output to a coincidence signal line. Only when all the associative memory circuits of a certain column subjected to collating generate coincidence signals, a coincidence signal of this column is supplied to an encoder. The encoder receives the coincidence signal and generates a coincidence address code.

The above collating operation is performed each time a symbol of the symbol string to be collated is supplied to the shift register. Therefore, each of all symbol strings sequentially extracted from the symbol string to be collated is collated in parallel with collating symbols stored in the respective columns of the associative memory.

In addition, unlike a conventional apparatus, the symbol string collating apparatus of the present invention does not require registers for storing collated states of symbol strings, registers representing the lengths of collating symbols, and a large number of logical gates for connecting the registers. Therefore, since the number of elements is decreased, a chip size can be reduced to decrease a manufacturing cost and to improve reliability. Furthermore, since an associative memory circuit which need not be collated is not subjected to collating, a variable-length symbol string can be collated.

An embodiment of the present invention will be described in detail below.

Figure 1:
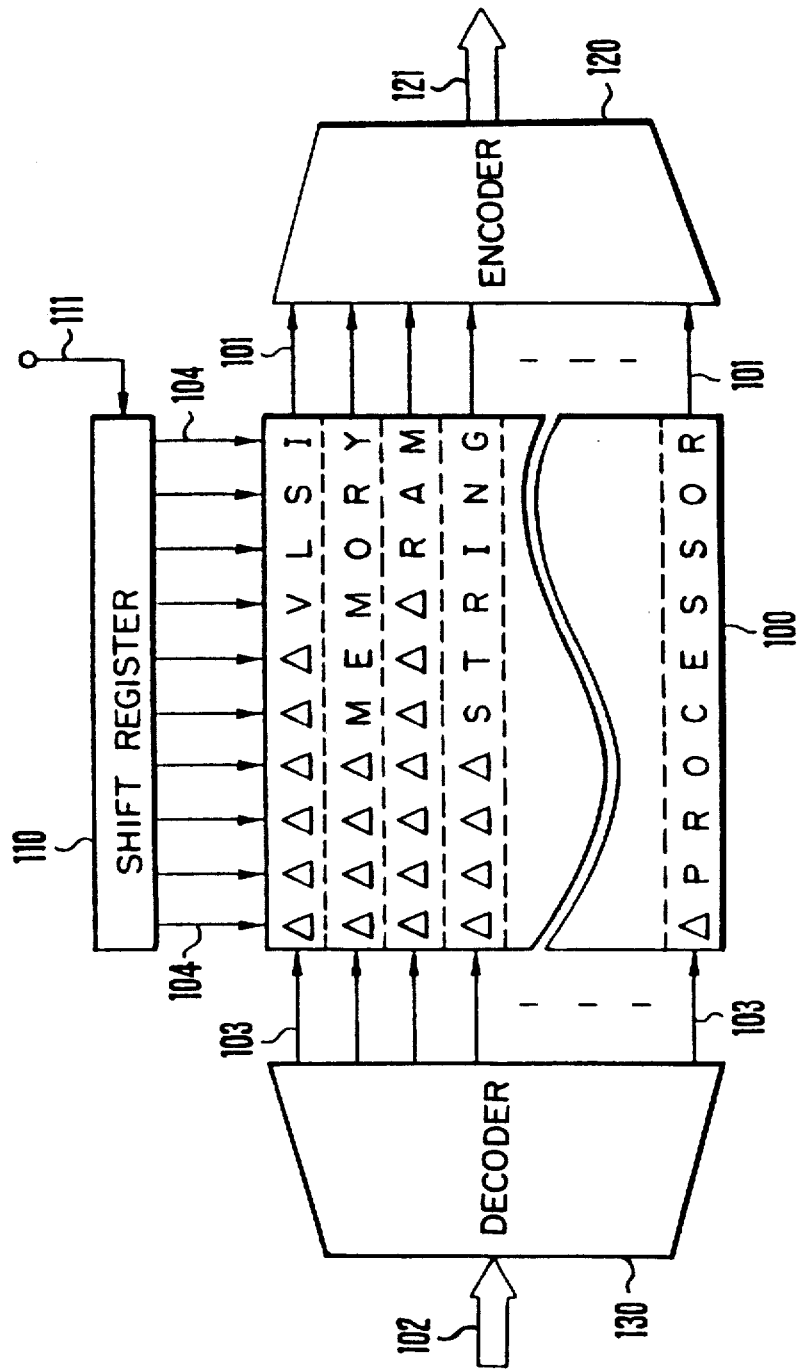
FIG. 1 is a block diagram showing an embodiment of a symbol string collating apparatus according to the present invention.

FIG. 1 shows an arrangement of an embodiment of the present invention. A symbol string collating apparatus shown in FIG. 1 registers a maximum of N collating symbol strings (variable-length reference data) each including M or less symbols in an associative memory (memory means) 100 and collates the N collating symbol strings in parallel with a symbol string to be collated (variable-length reference data to be collated) supplied in units of symbols from a symbol input terminal 111 to a shift register 110 for storing M symbols. When a part of the symbol string to be collated coincides with any of the collating symbol strings registered in the associative memory 100, a coincidence signal 101 is output from a column, in which the above collating symbol string is registered, to an encoder 120, and the encoder 120 generates a coincidence address code 121.

In order to register a symbol string in the associative memory 100, the symbol string to be registered is input from the symbol string input terminal 111, and an address in which the symbol string is to be registered is selected by causing a decoder 130 to selectively drive a word line 103 designated by a registration address 102.

In the apparatus according to this embodiment, the symbol string to be collated is directly input in units of symbols from the shift register 110 to retrieval inputs 104 of the associative memory 100. In the associative memory 100, the collating operation is performed each time a symbol is input to the shift register 110. That is, the collating operation is performed in a pipeline manner such that all the symbol strings obtained by shifting symbols constituting the input symbol string to be collated one by one are collated with all the collating symbol strings registered in the associative memory 100. Therefore, in the apparatus of this embodiment, retrieval of a text not including a delimiter code such as a text written in Japanese, i.e., a collating operation in a non-anchor mode can be performed. In this case, a don't care signal $\Delta$ in the associative memory 100 represents that a corresponding associative memory circuit does not influence the collating operation.

Figure 2:
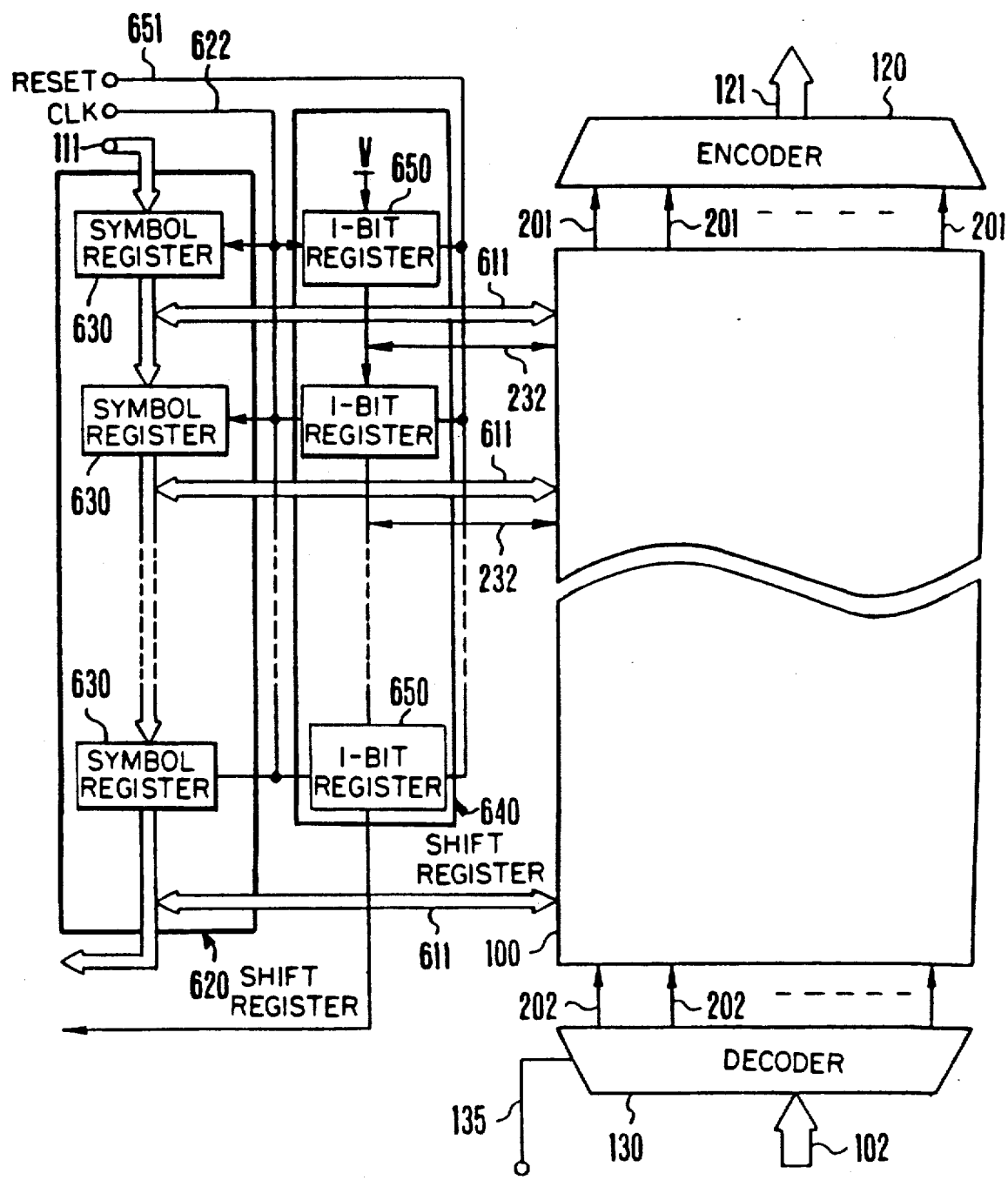
FIG. 2 is a block diagram showing a shift register of the symbol string collating apparatus.

With reference to FIG. 2, an arrangement and an operation of the shift register 110 of the symbol string collating apparatus of the present invention shown in FIG. 1 will be described. In the symbol string collating apparatus shown in FIG. 2, a collating symbol string and a symbol string to be collated are input from the symbol string input terminal 111 in series to a first shift register 620 in units of symbols in synchronism with a clock signal 622. When the apparatus is arranged to register a maximum of N symbol strings each including M or less symbols as described above, the first shift register 620 is constituted by M symbol registers 630.

A symbol supplied from the symbol string input terminal 111 and temporarily stored in each symbol register 630 is supplied to the associative memory 100 via a symbol input/output line 611. A second shift register 640 is constituted by M series-connected 1-bit registers 650. The content of each register 650 is supplied as a don't care signal 232 (specific data) to the associative memory 100.

In order to register a symbol string in the associative memory 100, a reset signal 651 is supplied to clear the contents of the registers 650 of the second shift registers 640 before registration. At the same time a collating symbol string is input in series to the first shift register 620 in units of symbols in synchronism with the clock signal 622, "1"s are sequentially stored in the second shift register 640. After all symbols of the collating symbol string are input, the collating symbol string and the don't care signal 232 representing validity or invalidity of each symbol of the collating symbol string by "1" or "0", respectively, are supplied in parallel to the associative memory 100. When a registration pulse 135 is supplied in this state, a word line 202 designated by the registration address 102 is driven to write the collating symbol string and the don't care signals 232.

A collating operation is performed by inputting symbols of a symbol string to be collated, written from the symbol string input terminal in the first shift register 620, to the associative memory 100 via the symbol I/O lines 611. The collating operation is performed each time a symbol of the symbol string to be collated is input to the first shift register 620. Therefore, the symbol string to be collated is collated in parallel with all the collating symbol strings each time it is shifted in units of symbols. Therefore, even if a delimiter signal representing a break between input signal strings is not included in the symbol string to be collated, collating can be performed.

Figure 3:
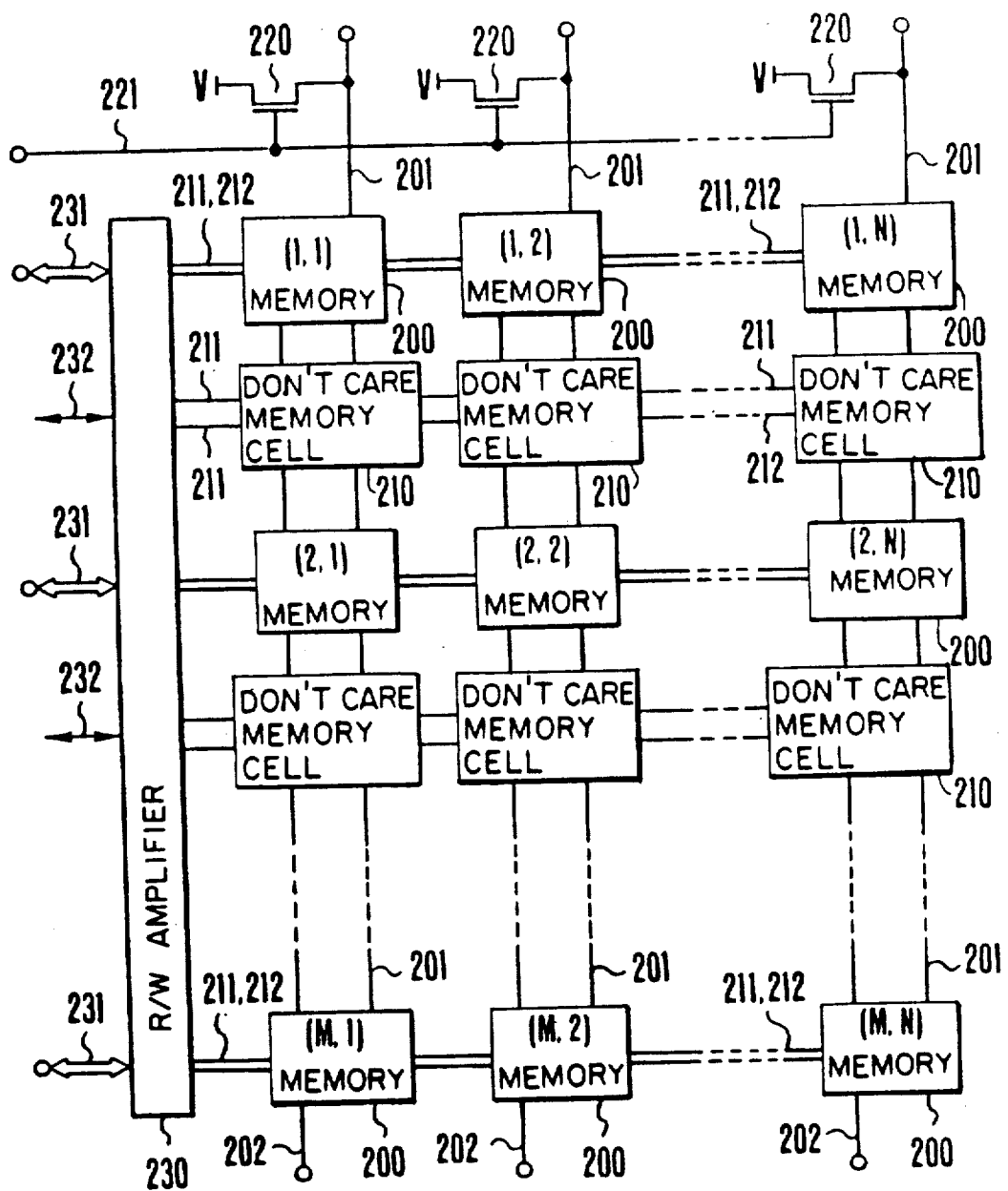
FIG. 3 a block diagram showing an arrangement of an associative memory for use in the symbol string collating apparatus shown in FIG. 1.

FIG. 3 shows an arrangement of an embodiment of the associative memory 100 used in the symbol string collating apparatus of the present invention shown in FIG. 1.

This associative memory can register and retrieve N symbol strings each including M or less symbols. The associative memory comprises associative memory circuits (memory circuits) 200 arranged in an M (rows)×N (columns) matrix, don't care memory cells 210 each for controlling opening/closing of a coincidence signal line 201 of a corresponding one of the associative memory circuits 200, transistors 220, each connected to the coincidence signal line 201 of the associative memory 200 in the first row of each column, for precharging the coincidence signal line 201 to a high potential prior to the collating operation, and a read/write (R/W) amplifier 230 for supplying a collating symbol string or a symbol string to be collated to or for receiving read data from the associative memory circuits 200 and the don't care memory cells 210 via bit lines 211 and 212.

An operation of the associative memory of this embodiment shown in FIG. 3 will be described in detail below. Each of the M (rows)×N (columns) associative memory circuits 200 can register one symbol. Therefore, the associative memory of this embodiment can register N symbol strings each including M or less symbols.

In order to register a symbol string constituted by L or less symbols, L symbols of the collating symbol string are supplied in parallel to the symbol I/O terminals 231 each having a bit width of a symbol code. At this time, the last symbol of the collating symbol string is supplied to the symbol I/O terminal 231 of the first row. Don't care signals 232 for defining the length of the collating symbol string are supplied together with the collating symbol string.

The input collating symbol string and the don't care signals 232 are supplied to the associative memory circuits 200 and the don't care memory cells 210 of all the columns via the R/W amplifier 230 and the positive/negative bit lines 211 and 212 and stored in the associative memory cell 200 and the don't care memory cell 210 of a column designated by the selectively driven word line 202.

When "0" is stored, the don't care memory cell 210 opens the coincidence signal line 201. Therefore, a don't care signal not affecting the collating operation is stored in the associative memory circuit 200 at an upper bit position of the don't care memory cell 210 storing "0". Therefore, in order to register a symbol string including L symbols in the associative memory of this embodiment, "1"s are set in the don't care signals 232 for the first to (L−1)th rows, and "0" are set in those for the Lth to (M−1)th rows, thereby storing the don't care signals in the associative memory circuits 200 from the (L +1)th rows. Therefore, the associative memory circuits corresponding to upper bits from the don't care memory cells 210 storing "0" do not affect the collating operation. Therefore, symbol strings of various lengths can be registered.

Prior to the collating operation, in the associative memory, a precharge signal 221 is supplied to the transistor 220 of the column in which the symbol string is registered, thereby charging the coincidence signal line 201 to a high potential. Symbols of a symbol string to be collated are supplied to the signal I/O terminals 231 and then to the associative memory circuits 200 of all the columns via the R/W amplifier 230 and the positive/negative bit lines 211 and 212.

The coincidence signal lines 201 of the associative memory circuits 200 of a column storing a symbol string, other than the don't care symbols, different from the symbol string to be collated go to a low impedance and are discharged from the high to low potential. That is, the potential of the coincidence signal lines 201 of each column represents coincidence or incoincidence between the symbol string to be collated and the collating symbol string of the column. The high potential corresponds to a coincidence state.

A read operation is performed as in a conventional memory. That is, by selectively driving the word line 202, collating symbols of a designated column are read out to the symbol I/O terminals 231 via the positive/negative bit lines 211 and 212 and the R/W amplifier 230.

With reference to FIGS. 4A, 4B, and 5, the associative memory circuit 200 and the don't care memory cell 210 will be described in detail below.

FIG. 4A shows an arrangement of an associative memory cell in the associative memory circuit 200.

Referring to FIG. 4A, the associative memory cell comprises MOS transistors 360, 370, and 380 for comparing the positive/negative contents of a memory cell 350 with collating data on the positive/negative bit lines 211 and 212 and setting the coincidence signal line 201 to the ground potential upon incoincidence. The memory cell 350 comprises two inverters 310 and 320 whose inputs and outputs are connected with each other, and two MOS transistors 330 and 340 for connecting the outputs of the inverters 310 and 320 to the positive/negative bit lines 211 and 212, respectively.

The associative memory cell has, in addition to a function of performing a read/write operation by setting the word line 202 at a high potential, a collating means for collating the positive/negative bit lines 211 and 212 with stored collating data.

A collating result is output to the coincidence signal line 201. An impedance of the coincidence signal line 201 is increased upon coincidence and decreased upon incoincidence.

FIG. 4B shows an arrangement of the associative memory circuit 200 shown in FIG. 3. The associative memory circuit shown in FIG. 4B comprises the associative memory cells 390 shown in FIG. 4A aligned in number corresponding to the number of bits of a symbol code, and the word lines 202 and the coincidence signal lines 201 connected in common.

A collating symbol code is supplied to the associative memory cells 390 via the positive/negative bit lines 211 and 212. When the collating symbol code coincides with symbols stored in the associative memory cells 390, the coincidence signal lines 201 of all the associative memory cells 390 are set to a high impedance.

That is, this associative memory circuit has functions of registering, collating, and reading one symbol.

FIG. 5 shows an arrangement of the don't care memory cell 210 shown in FIG. 3. The don't care memory cell 210 shown in FIG. 5 comprises two inverters 410 and 420 whose inputs and outputs are connected with each other, two MOS transistors 430 and 440 for connecting the outputs of the inverters 410 and 420 with the positive/negative bit lines 211 and 212, respectively, and a MOS transistor 450 for opening/closing the coincidence signal line 201 in accordance with a memory content output 411 of the don't care memory cell 210.

The two inverters 410 and 420 and the two MOS transistors 430 and 440 constitute a symbol cell. When the memory content of the memory cell is "1", i.e., when the memory content output 411 is "1", the MOS transistor 450 is turned on, and the upper/lower coincidence signal lines 201 are energized. When the memory content output 411 is "0", the upper/lower coincidence signal lines 201 are opened.

By connecting the output of the inverter 420 to a gate and connecting the MOS transistor 450 in parallel with a MOS transistor having a different channel, a voltage drop in the coincidence signal line 201 can be prevented.

As described above, in the symbol string collating apparatus of this embodiment, N symbol strings each including M or less symbols are registered to perform high-speed collating. In addition, since a register array or a logical gate for forming a finite-state automaton is not included between the associative memory apparatus 100 and the encoder 120, the number of elements can be largely decreased.

Furthermore, the number of the associative memory cells 390 and the don't care memory cells 210 is only about 1.5 times that of static RAM cells. Therefore, a one-chip symbol string collating apparatus of 512 Kb or more can be realized by using a 1-Mb LSI memory technique. This corresponds to storage of 8,000 words each having eight or less characters each expressed by a character code of eight bits. That is, a maximum of 8,000 key words can be extracted at high speed from a text read out from a communication line, a magnetic disk, or an optical disk.

Figure 6:
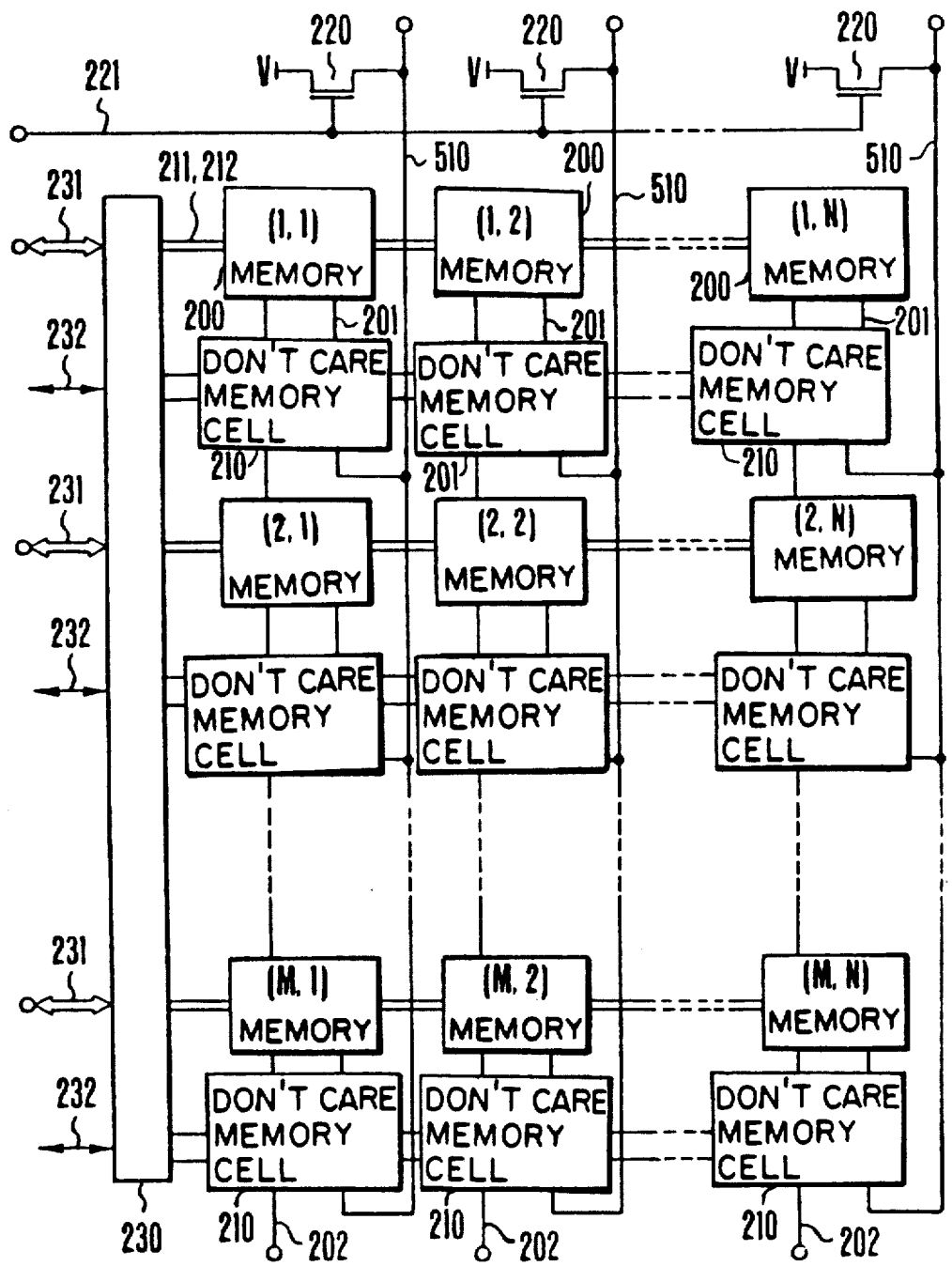
FIG. 6 is a block diagram showing another embodiment of the associative memory for use in the symbol string collating apparatus of the present invention.

FIG. 6 shows an arrangement of another embodiment of an associative memory as a component of the symbol string collating apparatus of the present invention.

The associative memory shown in FIG. 6 includes, for each column, a main coincidence signal line 510 to which coincidence signal lines 201 of each column are connected. In addition, a don't care memory cell 210 of the Mth row, which is not present in the associative memory shown in FIG. 3, is additionally provided.

In the associative memory of this embodiment having the above arrangement, the coincidence signal lines 201 can be separated in units of the don't care memory cells 210. That is, by writing "0" in the don't care memory cell 210, a symbol string including a don't care symbol at an arbitrary position can be registered. Therefore, a symbol string only a part of which coincides can be collated. This is generally called a symbol string collating function of Fixed Length Don't Care (FLDC).

In this embodiment, other registering, collating, and reading operations are similarly performed as in the associative memory shown in FIG. 2.

The symbol string collating apparatus of this embodiment includes a function of collating a partially coincident symbol string in addition to the functions of the symbol string collating apparatus of the above embodiment. This function is realized by adding only a small number of elements.

As has been described above, the symbol string collating apparatus of the present invention can easily solve the problems of a conventional symbol string collating apparatus, i.e., problems of a too long collating time or an increase in cost and reliability degradation caused when a chip size is increased due to an LSI arrangement. In addition, the present invention can register and collate a variable-length symbol string or a symbol string including a don't care symbol in a collating symbol string.

Furthermore, the present invention does not require a register array or logic gate for forming a finite-state automaton which is required in a conventional symbol string collating apparatus.

As described above, the symbol string collating apparatus of the present invention can be used to retrieve key words from a text. When transmission addresses of information packets in a communication line are stored in the symbol string collating apparatus of the present invention, however, a communication line control apparatus for selectively supplying the information packets to desired terminals at high speed can be realized. In addition, by utilizing the symbol string collating apparatus of the present invention, a protocol control apparatus for interpreting various control protocols in a communication line or file access at high speed can be easily realized.

What is claimed is:

1. A symbol string apparatus for searching for character string, comprising:
    memory means including a plurality of memory circuits arranged in a matrix in rows and columns, said memory circuits of said columns storing a plurality of first variable-length reference data of a symbol string and storing specific data in the memory circuits not occupied by the reference data;
    a shift register having a plurality of stages in the number equal to the number of rows of said matrix and receiving and storing second variable-length reference data which are externally input in series to said shift register in units of symbols, said shift register being directly connected to said memory means to supply thereto variable-length reference data to be collated in parallel;
    said memory means including collating means for collating the reference data supplied from said shift register with the first reference data stored in said memory circuits of said columns in parallel, said collating means being arranged in each memory circuit of each column of said memory means so as to simultaneously collate all the variable-length reference data supplied thereto from said shift register; and
    an encoder receiving outputs of said memory means for generating an output signal obtained as a result of collating by said collating means when at least a part of the reference data to be collated coincides with said first variable-length reference data.

2. An apparatus according to claim 1, wherein when the variable-length reference data supplied from said shift register and the variable-length reference data stored in said memory circuits of each column perfectly coincide with each other, said encoder generates an output signal.

3. An apparatus according to claim 1, and further comprising a decoder for designating an address of said memory means wherein the variable-length reference data is written in said memory means such that said decoder for designating an address of said memory means writes the variable-length reference data and the specific data from said shift register in said memory circuits in said memory means.

* * * * *